No. 660,995. Patented Oct. 30, 1900.
C. F. MURRAY.
DOUBLE SEATED VALVE.
(Application filed Dec. 30, 1899.)
(No Model.)
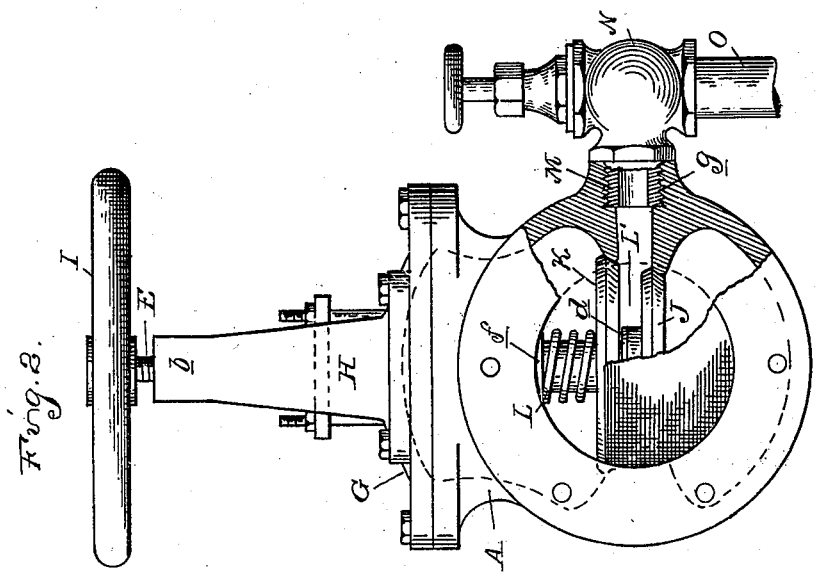
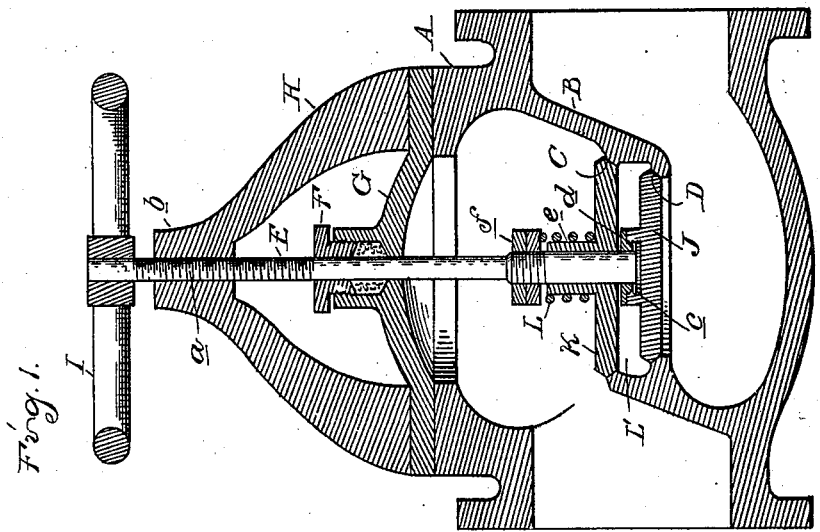
Witnesses
H. C. Smith.
Inventor
Charles F. Murray
By
Att'ys.
THE NORRIS PETERS CO., PHOTO-LITHO., WASHINGTON, D. C.

United States Patent Office.

CHARLES F. MURRAY, OF WYANDOTTE, MICHIGAN, ASSIGNOR OF ONE-HALF TO CHARLES LORIMER, OF SHABBONA, MICHIGAN.

DOUBLE-SEATED VALVE.

SPECIFICATION forming part of Letters Patent No. 660,995, dated October 30, 1900.

Application filed December 30, 1899. Serial No. 742,054. (No model.)

*To all whom it may concern:*

Be it known that I, CHARLES F. MURRAY, a citizen of the United States, residing at Wyandotte, in the county of Wayne and State of Michigan, have invented certain new and useful Improvements in Double-Seated Valves, of which the following is a specification, reference being had therein to the accompanying drawings.

The invention relates to a double-seated valve; and it is the object of the invention to obtain a valve in which the leakage from one seat to the other thereof is absolutely prevented when the valve is closed, even where imperfections exist in the seat.

To this end the invention consists in a double-seated valve having a valve-controlled vent-passage communicating with a space between the seats, whereby any leakage past one of said seats may be allowed to escape through said vent before it can pass by the second seat.

The invention further consists in the peculiar construction, arrangement, and combination of parts, as more fully hereinafter described and claimed.

In the drawings, Figure 1 is a longitudinal section through a valve to which my improvements are applied. Fig. 2 is an end elevation thereof, partly in section.

I have shown in the drawings my invention applied to a globe-valve; but it is obvious that it could also be employed upon other forms, such as gate-valves. A description of this one form, however, I deem sufficient.

A is the casing, of any suitable form, having therein the apertured division-wall B, provided with the seats C and D.

E is the valve-stem, passing through a suitable stuffing-box F in the cover G of the valve and having a threaded portion $a$.

H is a bracket having the threaded socket $b$, with which the threaded portion $a$ engages, and I is the operating hand-wheel, the parts thus far described being of usual form and constituting no part of my invention.

At the end of the valve-stem E is secured the disk J, adapted to engage with the seat D. This disk is preferably secured by forming a head $c$ on the end of the stem, which engages with a socket in the disk and is secured by the ring $d$, a slight vertical play being preferably allowed for the head in its socket.

K is a second disk which is sleeved upon the stem E and in the open position of the valve rests against the collar $d$.

L is a spring surrounding the hub $e$ of the disk K and bearing against the collar $f$ upon the stem F. The disk K is adapted to engage with the seat C, while between the disks K and J and seats C and D is preferably formed a chamber L'.

M is an outlet-passage formed in the casing, connected with the chamber L, and N is a valve connected with said outlet-passage, preferably by a threaded nipple $g$, engaging with the threaded socket in the casing A. The valve N may be of any suitable form, the drawings showing a small globe-valve.

O is an escape-pipe connected to the casing of the valve N upon the opposite side of the valve.

The construction being as described, whenever the main valve is closed, which may be done by turning the hand-wheel I and forcing the disks J and K to the seats D and C, respectively, the valve N is opened, and before the main valve is opened the valve N is closed. Thus should any steam or whatever fluid is controlled by the main valve pass by one of the disks and its seat into the chamber L it will be allowed free escape through the valve N and escape-pipe O, and thus will not be forced past the second disk and its seat.

What I claim as my invention is—

1. A double-seated valve comprising a casing having two separated seats therein, a chamber between said seats and a vent-aperture connecting with said chamber of a valve comprising a valve-stem, a disk secured to said stem with a slight longitudinal play therein adapted to engage with one of said seats, a second disk sleeved upon said stem for engaging with the other seat and a spring for pressing the latter disk to its seat.

2. A double-seated valve comprising a casing having two separated seats therein, a chamber between said seats and a vent-aperture connecting with said chamber, a valve comprising a valve-stem, a disk secured to said stem with a slight longitudinal play thereon adapted to engage with one of said seats, a second disk sleeved upon said stem for engaging with the other seat, a spring for pressing the latter disk to its seat, and an auxiliary valve controlling said vent-aperture.

In testimony whereof I affix my signature in presence of two witnesses.

CHARLES F. MURRAY.

Witnesses:
L. J. WHITTEMORE,
H. C. SMITH.